United States Patent [19]
Gibson et al.

[11] Patent Number: 5,952,249
[45] Date of Patent: Sep. 14, 1999

[54] AMORPHOUS CARBON-COATED CARBON FABRIC WET FRICTION MATERIAL

[75] Inventors: David W. Gibson, Newport Beach, Calif.; Norman B. Mack, Jr., Hudson; Robert W. Pepper, Raymond, both of N.H.

[73] Assignee: Textron Systems Corporation, Wilmington, Mass.

[21] Appl. No.: 08/767,691

[22] Filed: Dec. 17, 1996

[51] Int. Cl.$^6$ ................ B32B 9/00; B05D 5/00; C01B 31/00

[52] U.S. Cl. ............ 442/179; 442/172; 442/178; 442/148; 428/220; 428/319.1; 428/327.7; 428/408; 428/409; 428/698; 427/708.8; 427/228; 427/419.2; 427/419.6; 427/419.7

[58] Field of Search .................. 428/408, 220, 428/327.7, 319.1, 409, 698; 442/172, 178, 179, 148; 427/208.8, 228, 419.2, 419.6, 419.7

[56] References Cited

U.S. PATENT DOCUMENTS

| | | | |
|---|---|---|---|
| 3,624,717 | 11/1971 | Brubaker | 74/711 |
| 3,831,462 | 8/1974 | Baremor | 74/711 |
| 3,944,686 | 3/1976 | Froberg | 427/228 |
| 4,700,823 | 10/1987 | Winckler | 192/107 |

FOREIGN PATENT DOCUMENTS

0762009 A1  3/1997  European Pat. Off. .

OTHER PUBLICATIONS

Smith, W.H. and Leeds, D.H., "Pyrolytic Graphite," *Modern Materials*, 7: 162 (1970).

Kliner, K.M., Anderson, D.P., and Naughton, T.D.; "Process Relationship as Influenced by Carbonization Rate," Jun. 1993: i/ii and 1–4, NSN 7540–010280–5500.

*Primary Examiner*—Richard Weisberger
*Attorney, Agent, or Firm*—Hamilton, Brook, Smith & Reynolds, P.C.

[57] ABSTRACT

The present invention provides a novel amorphous carbon-coated carbon fabric which comprises a single ply of a woven carbon fabric comprising interwoven strands of yarn. The yarn strands are formed of bundles of individual fibers and have amorphous carbon disposed between the individual fibers.

The present invention also relates to a method of forming an amorphous carbon-coated carbon fabric. The method comprises the steps of (1) impregnating a woven carbon fabric with a resin; and (2) heating the resulting resin-impregnated carbon fabric to a temperature which is sufficient to char the resin to form a residue of amorphous carbon, thereby forming an amorphous carbon-coated carbon fabric material.

20 Claims, 3 Drawing Sheets

AMORPHOUS CARBON-COATED CARBON FABRIC WET FRICTION MATERIAL

BACKGROUND OF THE INVENTION

Carbon-coated carbon fabrics have found wide application, including friction applications, in the aerospace and missile industries, due primarily to their light weight, stability and stiffness at high temperatures. These materials are produced by resin-impregnation or chemical vapor deposition methods. Materials made via resin-impregnation include multiple carbon fabric layers which are impregnated with resin, molded to a thickness between 0.25 and 2 inches, and slowly carbonized at high temperature. Carbon-coated carbon fabrics made via chemical vapor deposition (CVD) typically comprise multiple layers of a porous material on which elemental graphitic carbon is deposited by pyrolysis of a hydrocarbon gas into its constituent elements. The physical properties of such carbon fabrics depend upon both the number of plies used and the amount of graphitic carbon present. For example, structural applications typically employ a material comprising multiple fabric layers which have been subjected to repeated CVD cycles, resulting in a dense, rigid material.

More recently, a wet friction application for a single layer of a carbon-coated carbon fabric, formed by CVD, was developed to solve automotive friction material performance problems. U.S. Pat. No. 4,700,823, issued to Winckler, discloses a CVD-coated carbon fabric for use in wet friction applications in automobile components. This material was formed by the general method disclosed in U.S. Pat. No. 3,944,686, issued to Froberg. Winckler teaches that CVD coating of a carbon mesh fabric for a relatively short period of time, such as several minutes, results in a flexible, porous material suitable for use in wet friction applications requiring a thin friction material, such as in a wet clutch or brake.

Despite the advance in the art represented by the disclosure of Winckler, currently available carbon-coated carbon fabrics continue to present disadvantages. For example, the CVD fabric is produced in large batch CVD furnaces which increase production costs significantly. This equipment is very expensive and, even with relatively short processing times, the method consumes significant amounts of energy due to the high temperatures and low pressures required. The CVD process also yields a non-uniform deposition of carbon on the fabric.

Consequently, there is a need for a carbon-coated carbon fabric suitable for use in wet friction applications which overcomes the disadvantages of the prior art materials. Also needed is a faster, more uniform and less expensive method for producing such a material.

SUMMARY OF THE INVENTION

The present invention provides a novel amorphous carbon-coated carbon fabric which is useful in wet friction applications, for example, in automobile brakes and transmissions. The amorphous carbon-coated carbon fabric comprises a single ply of a woven carbon fabric comprising interwoven strands of yarn. The yarn strands are formed of individual fibers which define gaps or spaces between adjacent fibers. The amorphous carbon-coated carbon fabric further comprises amorphous carbon disposed between the individual fibers. That is, at least a portion of the gaps between the individual fibers contain amorphous carbon. The amorphous carbon is present in an amount which is sufficient to provide significantly improved wet friction properties. The amorphous carbon-coated carbon fabric material can comprise from about 10% to about 150% or more amorphous carbon on a weight basis relative to the carbon fabric substrate. The amorphous carbon-coated carbon fabric is flexible, porous between the fiber yarns, and has a surface texture which is determined by the makeup of the yarn and the weave of the fabric.

In one embodiment, the yarn strands of the amorphous carbon-coated carbon fabric material are coated with a resin. In another embodiment, the yarn strands are coated with a partially charred resin.

The present invention also relates to a method of forming an amorphous carbon-coated carbon fabric. The method comprises the steps of (1) impregnating a single ply of a woven carbon fabric with a resin; and (2) heating the resulting resin-impregnated carbon fabric substrate to char the resin to form an amorphous carbon residue, thereby forming the amorphous carbon-coated carbon fabric material. Steps (1) and (2) can be repeated one or more times in sequence, as necessary to produce a material having the desired composition and properties. This material can further be impregnated with additional resin to form an amorphous carbon-coated carbon fabric having resin-coated yarn strands. In one embodiment, this resin coating is then partially charred or carbonized to yield an amorphous carbon-coated carbon fabric wherein the yarn strands are coated with a partially carbonized or charred resin.

In yet another embodiment, the invention includes an improved wet friction device, such as an automotive brake, clutch or differential, or a multi-disc coupling device. The device comprises at least two members mounted to rotate relative to each other. Each member has a friction surface and these friction surfaces confront each other. The device further includes means for frictionally engaging the friction surfaces to slow the relative rotation of the members and a cooling liquid, such as an oil, which is in contact with the friction surfaces. The improvement comprises a sheet formed of an amorphous carbon-coated carbon fabric which defines at least one friction surface of the device.

The present invention provides many advantages. The amorphous carbon-coated carbon fabric material of the invention is substantially uniform, exhibits improved durability compared to prior art modified carbon fabric materials and is suitable for use in wet friction applications. Moreover, the material can be prepared rapidly by a relatively low cost method employing standard carbonization equipment. The disclosed method, for example, allows the continuous processing of material, as opposed to the batch processing required by the CVD method.

DETAILED DESCRIPTION OF THE INVENTION

Figure 1:
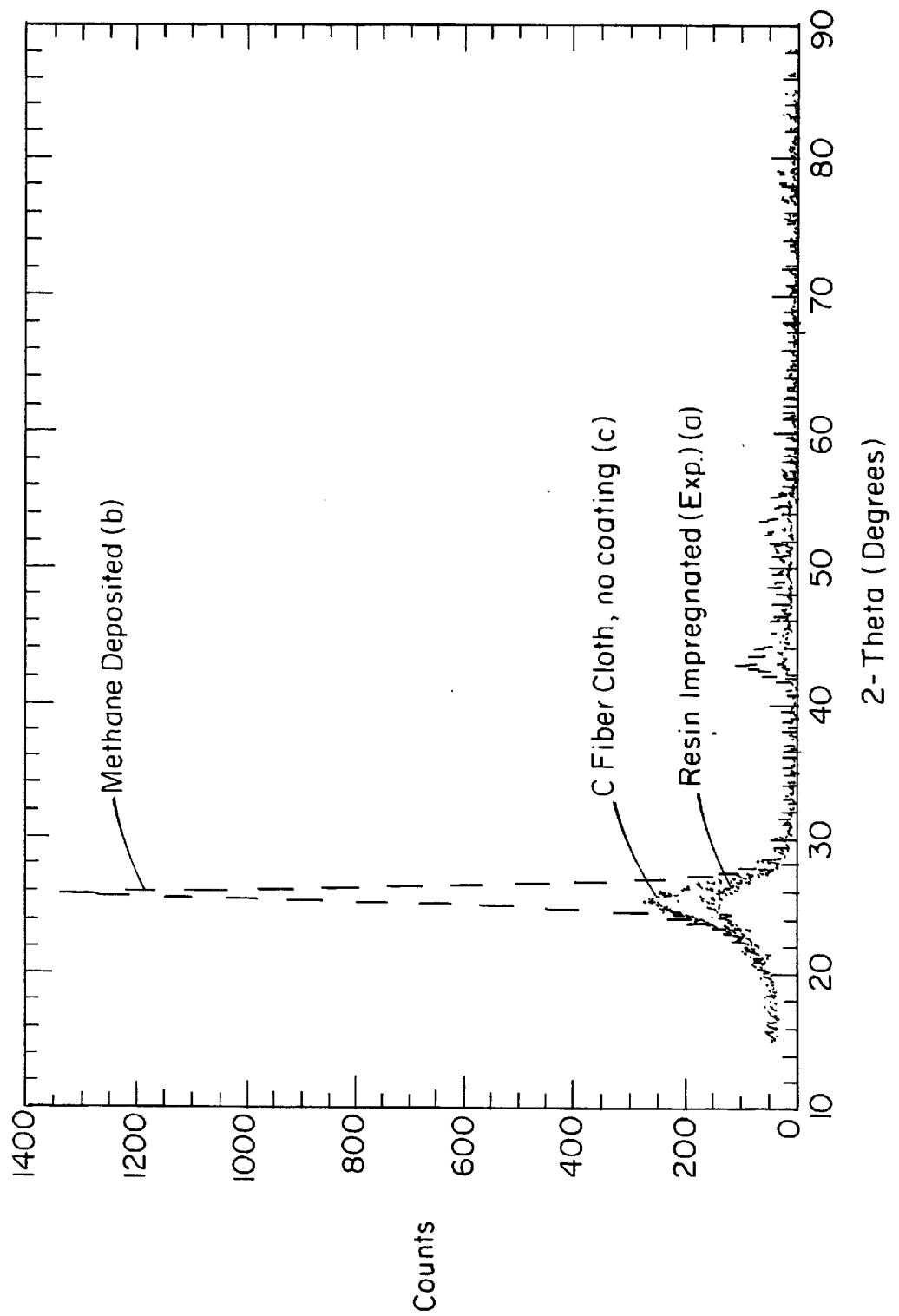
FIG. 1 is a plot of x-ray diffraction intensity versus angle, as determined for (a) an amorphous carboncoated carbon fabric material prepared by the general method described in Example 1; (b) a modified carbon fabric material formed by a conventional CVD process; and (c) the carbon fabric substrate used in the preparation of materials (a) and (b).

The features and other details of the invention will now be more particularly described and pointed out in the claims. It will be understood that the particular embodiments of the invention are shown by way of illustration and not as limitations of the invention. The principal features of the invention can be employed in various embodiments without departing from the scope of the present invention.

The present invention relates to a novel amorphous carbon-coated carbon fabric, a method of making the coated fabric, and device components which include this coated fabric in a friction surface.

The carbon fabric used in the present invention is a single-ply of a staple or continuous filament woven carbon fabric. This woven fabric is made of interwoven yarn strands. The yarn strands are formed of bundles of fibers, which include gaps or spaces between the individual fibers. Typically, each yarn strand includes between about 1000 and about 2000 individual fibers.

The weave of the fabric provides pores or gaps between the individual yarn strands. Typically, in wet friction applications, fluid flows through the pores and gaps between the yarn strands, for a woven friction material, and also through the individual yarn strands. Fluid flow through the fabric is generally within the plane of the fabric. The pores and gaps of the fabric tend to channel fluid away from the fabric surface, thereby eliminating hydroplaning and maintaining frictional contact of the fabric with an opposing surface. The rate of fluid flow through the fabric must be high enough to cool the fabric under friction conditions. The size and number of the gaps between the yarn strands of the woven carbon fabric depend upon the type of weave used, the thickness of the weave, the number of yarn strands per unit length and the basis weight, or weight per unit area, of the fabric. The carbon fabric can be woven into a variety of different weaves, such as plain weaves, twills, and satins, for example Crowfoot harness satin weave, 5 harness satin weave and 8 harness satin weave.

The ply of the carbon fabric used in the present invention is typically between about 10 mils and about 100 mils thick with a basis weight between about 3 oz/yd$^2$ and about 30 oz/yd$^2$.

The level of carbonization of the carbon fabric must be at least high enough that the fabric will generally be stable under typical wet friction conditions and have good friction properties. Fabric which is not stable may chemically degrade and off-gas (i.e. release hydrogen and oxygen) under wet friction conditions, thereby reducing the physical strength of the fabric. Further, uncoated fabrics with lower carbon contents have inferior friction properties compared to fabrics with higher carbon content. Typically, the carbon fabric should be at least about 70% carbon by weight, and preferably at least about 95% carbon by weight; most preferably the carbon content of the carbon fabric is 99% carbon by weight or more.

Suitable carbon fabrics are known in the art and include, for instance, those formed from polyacrylonitrile, oxidized polyacrylonitrile, petroleum, coal tar-based pitches and rayon. For example, suitable carbon fabrics include polyacrylonitrile-based materials, such as AvCarb™ CPW-003, CPW-006, CHS-808 and CHJ-008 fabrics (Textron Systems Corporation, Wilmington, Mass.); fabrics woven from THORNEL® Carbon Fibers T-300, 3K, 6K, 12K and P-25W (Amoco Performance Products, Inc.); fabrics woven from MAGNAMITE® graphite fiber Type AS4 (Hercules Incorporated, Wilmington, Del.); and FIBERITE fabric style W-134 and W-191 (Fiberite Corporation, Winona, Minn.). Examples of suitable coal tar pitch-based fabrics include the fabrics woven from DIALEAD® carbon fibers (Mitsubishi Chemical Corporation). Preferably, the carbon fabric is woven from oxidized acrylonitrile fibers.

In one embodiment, the carbon fabric is manufactured by a prior art process that includes the steps of oxidizing continuous polyacrylonitrile filaments, stretch breaking the oxidized filaments, and then spinning and twisting the broken filaments into yarn using conventional textile processing techniques. The yarn is then woven, for example, into a plain weave or twill fabric, and carbonized at a temperature of 1000–1800° C. A preferred fabric of this type is AvCarb™ 1243 (Textron Systems Corporation, Wilmington, Mass.), an open plain weave fabric having a basis weight of about 6.7 oz/yd$^2$ and a thickness in the range of 27–30 mils.

In the present invention, the amorphous carbon-coated carbon fabric material includes amorphous carbon. The term "amorphous", as used herein, refers to a material exhibiting significant disorder on the microscopic scale. For example, elemental carbon can exist as crystalline graphite, comprising layered sheets of carbon atoms which are oriented to define a hexagonal or rhombohedral crystal structure. Elemental carbon can also exist in a variety of well known less ordered, amorphous or microcrystalline forms. Such forms can comprise, for example, disordered columns formed of stacked sheets of carbon atoms. The crystallinity of a material can be readily determined using standard techniques, such as powder x-ray diffraction analysis. Typically, the carbon coating the carbon fabric in the present invention is mostly amorphous, and, preferably, entirely amorphous, such as is described in Example 4.

In the carbon-coated carbon fabric, amorphous carbon coats at least a portion of the surfaces of the individual fibers in a yarn strand and also fills at least a portion of the gaps among the individual fibers within the yarn strands of the fabric. The amorphous carbon can also partially fill the pores of the fabric mesh, i.e., the gaps among the yarn strands.

Figure 2A:
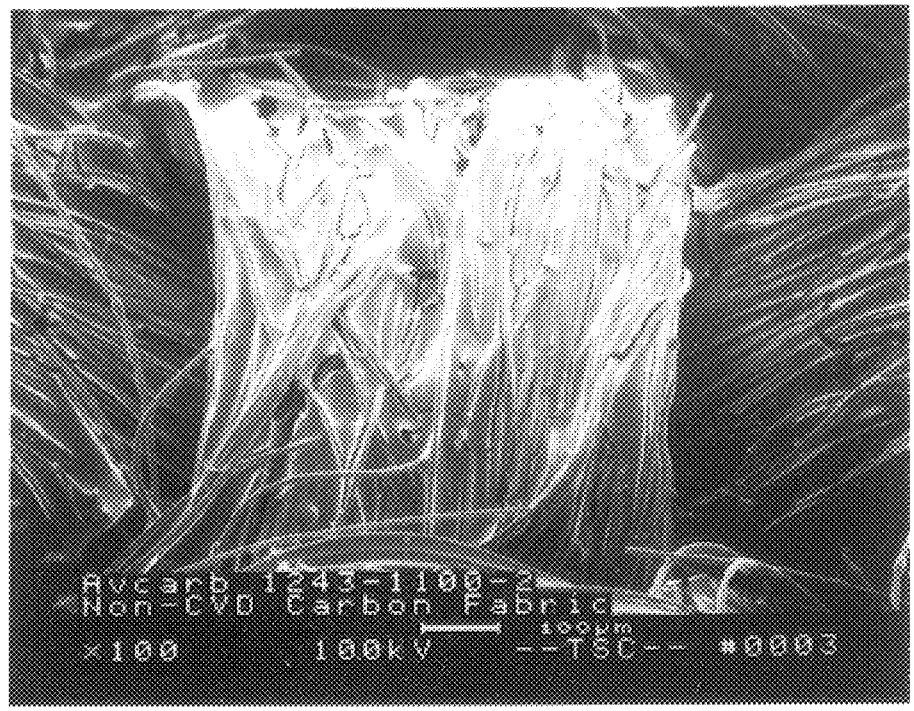
FIG. 2A is a scanning electron micrograph of an amorphous carbon-coated carbon fabric material prepared by a conventional CVD process.
Figure 2B:
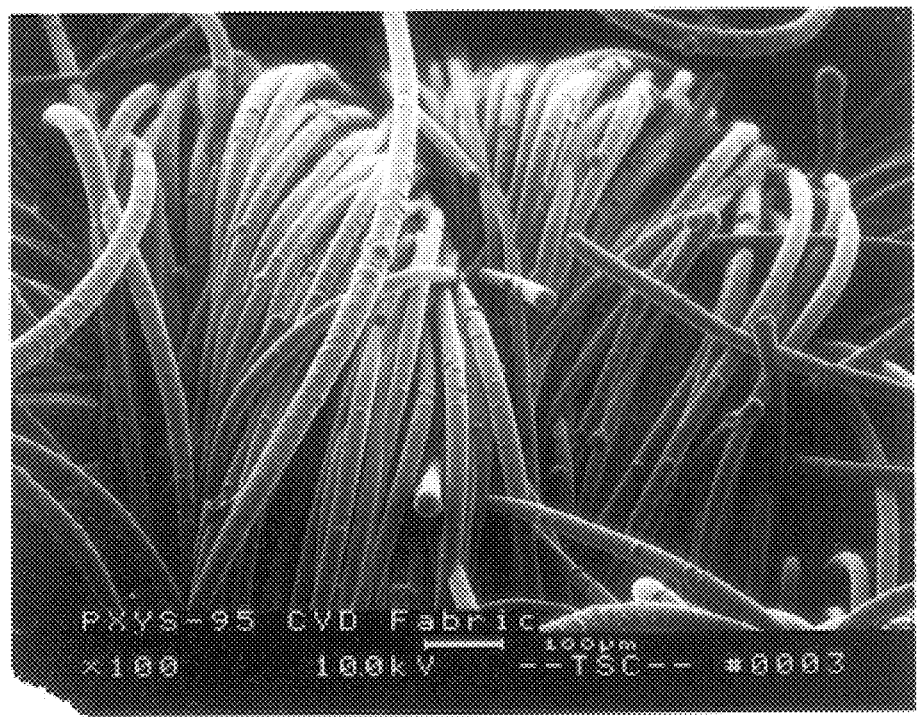
FIG. 2B is a scanning electron micrograph of an amorphous carbon-coated carbon fabric material made by the method described in Example 1.

A scanning electron micrograph of a typical amorphous carbon-coated carbon fabric of the invention, formed by the general method described in Example 1, is presented in FIG. 2A. This micrograph shows the fiber bundles which compose the interwoven yarn strands. Therein, at least a portion of the gaps between the individual fibers within each yarn strand is filled with amorphous carbon, giving some of the fibers the appearance of being fused with, or of adhering to, adjacent fibers. FIG. 2B shows a scanning electron micrograph of a modified carbon fabric material formed by a conventional CVD process. This process results in the deposition of polycrystalline carbon upon individual fibers. The spaces between the fibers of the CVD material, in contrast to the amorphous carboncoated carbon fabric of the present invention, shown in FIG. 2A, are not completely filled with carbon and, thus, the individual fibers appear distinct.

The amount of amorphous carbon coating the carbon fabric is an amount that significantly improves the wet friction properties of the original carbon fabric. "Significantly improved wet friction properties" as the term is used herein, refers to a measurable improvement in one or more properties, such as durability or porosity, which significantly increases the suitability of a material for use in wet friction applications. In the present case, the amorphous carbon-coated carbon fabric exhibits improved wet friction properties relative to the unmodified carbon fabric. The amount of amorphous carbon which is sufficient to provide improved wet friction properties will depend upon the specific wet friction application, the substrate used, and the presence or absence of a resin or partially charred resin coating on the fabric.

Amorphous carbon-coated carbon fabrics of this type can be characterized by the mass of amorphous carbon relative to that of the original woven carbon fabric, expressed as percent. An amorphous carbon-coated carbon fabric having an amorphous carbon/carbon fabric mass ratio of 0.25 is said to have a "25% carbon pickup", that is, a 25% weight increase over the original substrate due to the applied amorphous carbon. Typically, to significantly improve wet friction properties, the amorphous carbon-coated carbon fabrics of the present invention will have a carbon pickup value between about 10% carbon pickup and about 150% or greater carbon pickup of amorphous carbon. Preferably, the carbon pickup will be about 50% or more.

An example of an amorphous carbon-coated carbon fabric of the present invention is described in Example 1.

In a preferred embodiment of the present invention, the amorphous carbon-coated carbon fabric further includes a resin coating on the yarn strands of the fabric and the amorphous carbon. After resin coating, gaps must still exist between the yarn strands sufficient to allow fluid flow, at least across the surface of the fabric, and, possibly, through the fabric, when being used in a wet friction application.

The resin can be selected from among a variety of resins, such as thermosetting resins, including phenolic/formaldehyde resins, modified phenolic resins and phenolic/furfural resins, as are well known in the art. Suitable resins include SC1008 phenolic resin (Borden Packaging and Industrial Products), Ironsides phenolic resin and AROFENE® 295-E-50 phenolic resin (Ashland Chemical Co., Columbus, Ohio). This latter resin is supplied as a mixture having a nominal composition of 55–60 weight % phenolic resin, 20–25 weight % ethyl alcohol, 10–14 weight % phenol, 3–4 weight % methyl alcohol, 0.3–0.8 weight % formaldehyde and 5–10 weight % water.

The amount of resin coating used is an amount that will seal the amorphous carbon in the fabric, to reduce carbon dusting and flaking under wet friction conditions, thereby improving durability, and, if necessary, to reduce the fluid flow rate through the fabric. The amount of resin coating can also be characterized by a resin pickup value. The resin pickup value is the mass of the resin coating applied to the carbon-coated carbon fabric relative to the mass of the original carbon fabric, expressed as percent. Resin-coated fabrics of the present invention typically have resin pickup values ranging from about 5% to about 70%, and, preferably, between about 5% and about 30%. An example of a resin-coated amorphous carbon-coated carbon fabric is described in Example 2.

In an alternate embodiment, this resin coating is partially charred or carbonized. In this case, the resin is, preferably, a resin which forms a substantially amorphous carbon residue upon pyrolysis. Suitable resins include those previously discussed.

An amorphous carbon-coated carbon fabric material having a resin or partially carbonized resin coating can, optionally, have a buffed or smoothed surface.

The method of forming an amorphous carbon-coated carbon fabric of the present invention includes the steps of (1) impregnating a single ply of a suitable woven carbon fabric with a resin; and (2) heating the resin-impregnated carbon fabric to a temperature sufficient to char the resin, thereby forming an amorphous carbon-coated carbon fabric.

The resin-impregnated carbon fabric is preferably heated in an inert atmosphere, for example, a nitrogen, helium or argon atmosphere.

Suitable resins include organic materials which thermally degrade, or char, in an inert atmosphere, such as a nitrogen, argon or helium atmosphere, to form volatile products and a substantially amorphous carbon residue. Resins of use in the method are "charrable resins", a term used herein to denote organic materials which yield substantial amounts (e.g., about 50% or higher yield) of an amorphous carbon residue upon thermal degradation at temperatures on the order of 1000° C. More preferably, the resin is a thermosetting charrable resin, which forms a crush-resistant amorphous carbon residue. Such resins include phenolic resins, such as phenol/formaldehyde resins and phenol/furfural resins, which are well known in the art. Examples of suitable resins of this type are as previously discussed. Also suitable are isotropic pitches, for example, those made from coal tar or petroleum or chemical precursors.

In an alternate embodiment, the resin includes solid amorphous carbon and/or graphite, preferably in powder form, which is mixed with the resin or suspended in the resin solution.

The carbon fabric can be impregnated with the resin by standard methods, for example, by immersing or dipping the fabric in a liquid resin or a resin solution, i.e., the resin and a volatile organic solvent, or by painting or rolling a liquid resin or resin solution onto the substrate. The solution is, preferably, of sufficiently low viscosity to penetrate, or flow within, the fiber bundles of the yarn. For example, AROFENE® 295-E-50 resin is provided by the manufacturer as a solution comprising phenolic resin, phenol and formaldehyde in a mixture of methanol and ethanol. This solution can be used as received (100%) or diluted with additional solvent to concentrations ranging from about 15% to 100% by mass, depending upon the material characteristics desired.

The resin can also be applied to the carbon fabric by laying a solid resin film, such as an epoxy resin film, upon the fabric and then heating the resin film to a temperature sufficient to melt the resin. The melted resin then flows into the fabric, thereby impregnating the fabric with the resin.

Excess resin can, optionally, be removed from the resin-impregnated substrate prior to charring. This can be done, for example, by passing the resin-impregnated substrate through a Nip roll device, which further ensures a uniform distribution of resin.

The method can further comprise the step of heating the resin-impregnated carbon fabric to a temperature sufficient to cure or harden the resin. The temperature sufficient to cure the resin will depend upon the identity of the resin and is known in the art for a wide variety of resins. For example, a phenolic-formaldehyde resin, such as AROFENE® 295-E-50, can generally be cured by heating in air to a temperature in the range of about 150–350° C. Curing stabilizes the resin by cross-linking, resulting in a material that does not melt during charring.

The resin-impregnated carbon fabric can be heated in a conventional carbonizing furnace as described in Example 1. The carbonizing furnace is preferably a tunnel furnace or tunnel kiln which can be flushed with an inert atmosphere, such as nitrogen, and through which the material is transported on a conveyor belt. The temperature sufficient to pyrolyze the resin to form amorphous carbon char will depend upon the resin used, but for phenolic resins is typically at least about 700° C., and preferably in the range up to about 1000° C. to 1200° C. or higher. The duration of the heating step will be sufficient to substantially degrade the resin and will depend upon the identity of the resin, the amount of resin to be charred and the temperature of the oven. Typically, the resin is charred until the residue is at least about 80 weight % carbon, preferably at least about 90 weight % carbon, and more preferably at least about 95 weight % carbon.

In one embodiment, the resin is charred in a tunnel furnace having a plurality of heating zones. When the resin coating is a phenolic resin, such as AROFENE® 295-E-50, a furnace having five heating zones can be used with suitable zone temperatures as follows: zone 1: 325–375° C., preferably about 350° C.; zone 2: 400–460° C., preferably about 430° C.; zone 3: 450–600° C., preferably about 525° C.; zone 4, 875–1025° C., preferably about 900° C.; and zone 5: 1075–1125° C., preferably about 1100° C. In this embodiment, the total residence time is approximately 20–30 minutes, with a typical residence time in zone 5 of about 3 to 4 minutes.

The amount of amorphous carbon in the coated fabric can be increased by subjecting the material to one or more additional resin impregnation-resin charring cycles, i.e., by repeating steps (1) and (2) in sequence one or more times. For example, the amorphous carbon-coated carbon fabric can be impregnated with resin and then heated to char the resin. optionally, the resin can be dried and/or cured prior to the char step. This process can be repeated as necessary to produce a material having the desired carbon pickup value.

In a preferred embodiment, the method further comprises the steps of impregnating the amorphous carbon-coated carbon fabric with resin, then drying and curing the resin, to form an amorphous carbon-coated carbon fabric which is coated with a resin, as described in Example 2.

In another embodiment, the method further includes the step of partially charring or carbonizing the final resin coating by heating the resin-coated amorphous carbon-coated carbon fabric to a temperature sufficient for partial charring or carbonization of the resin coating, as described in Example 3. This forms an amorphous carbon-coated carbon fabric comprising yarn strands which are generally coated with a partially carbonized resin. For example, a phenolic/formaldehyde resin, such as AROFENE® 295-E-50, can be partially carbonized by heating the resin-impregnated amorphous carbon-coated carbon fabric material in an inert atmosphere to a temperature in the range of about 300° C. to 450° C. for at least about 1 minute.

An amorphous carbon-coated carbon fabric material having a resin coating or a partially carbonized resin coating can, optionally, be buffed using emory cloth or by other methods which are known in the art.

Pyrolytic carbon formed by conventional carbon vapor deposition processes is polycrystalline graphite (Smith et al., *Modern Materials*, 7: (1970). The present method, however, yields a residue of amorphous carbon. Example 4 describes an x-ray crystallographic analysis of the resin-coated amorphous carbon-coated carbon fabric of Example 2 and a carbon-coated carbon fabric formed by chemical vapor deposition. As discussed in the example, the material formed by CVD exhibits a diffraction pattern characteristic of hexagonal graphite consisting of narrow, high intensity diffraction maxima. The amorphous carbon-coated carbon fabric, in contrast, exhibits weaker and broader diffraction maxima that can be attributed to the underlying carbon fabric substrate. This indicates that the carbon residue within this material is amorphous.

The amorphous carbon-coated carbon fabric of the present invention is well suited for use in wet friction applications due to its flexibility, fluid flow rate and durability. For example, the durability of samples of the material has been assessed by crush testing, as described in Example 5. The materials were examined by scanning electron microscopy before and after crush testing. Amorphous carbon-coated carbon fabrics having yarn strands coated with resin or partially carbonized resin are particularly resistant to fiber breakage and dusting under the test conditions.

The durability and flow rate of samples of the amorphous carbon-coated carbon fabric material of the present invention have also been determined by dynamometer testing, as described in Example 6. The results of these tests indicate that amorphous carbon-coated carbon fabrics having resin-coated yarn strands, prepared according to the general method described in Example 2, have demonstrated excellent fluid flow rates, wear and friction characteristics for use in wet friction applications.

Suitable wet friction applications, for use of the amorphous carbon-coated carbon fabric of the present invention, include automobile brakes, differentials, clutches and other friction coupling devices. The invention includes, but is not limited to, improved devices of this type wherein the improvement resides in the use of the amorphous carbon-coated carbon fabric of the present invention as at least one friction surface.

In general, a device of this type comprises at least two members mounted to rotate relative to each other. Each member includes a friction surface and the friction surfaces confront each other.

The device further comprises means for frictionally engaging the friction surfaces to slow the relative rotation of the members. The device also includes a cooling liquid, such as an oil, which is in contact with the frictional surfaces.

In one embodiment, the friction surface is formed by applying a sheet of the amorphous carbon-coated carbon fabric to a structural element of the device. This can be done, for example, by bonding or fixing the amorphous carbon-coated carbon fabric to the structural element with an adhesive. Alternatively, friction is provided by placing at least one disc, made of the amorphous carbon-coated carbon fabric of the present invention, between two rotating metal discs.

In yet another embodiment, the wet friction device is an automotive differential which includes a casing mounted for rotation in a liquid lubricant bath. First and second side gears are mounted in the casing for rotation relative to each other and to the casing. First and second sets of interleaved metal discs, are mounted within the casing and rotatable with the casing and at least one of the gears. The metal discs have mutually facing friction surfaces. Also included are means to engage the friction surfaces to slow the relative rotation of the discs. The friction surface of one of the pair of discs is defined by the metal of the disc. The other disc within the pair has a friction surface which is defined by a section of an amorphous carbon-coated carbon fabric bonded to the disc.

Suitable devices which can be modified in this way include locking differentials and limited slip differentials. Several examples of such devices are provided in U.S. Pat. No. 4,700,823, issued to Winckler, the contents of which are incorporated herein by reference. An example of a suitable locking differential is described in U.S. Pat. No. 3,624,717, issued to Brubaker, the contents of which are incorporated herein by reference. This differential includes a multiple disc friction clutch which is applied to retard the relative rotation between drive axles when the relative rotation exceeds a predetermined level. Another example is the locking differential disclosed in U.S. Pat. No. 3,831,462, issued to Baremor, the contents of which are incorporated herein by reference. This device comprises a pair of multiple disc friction clutches which are continuously applied by relatively weak spring forces and by side forces acting between the differential side gears and pinions.

The invention will now be further and specifically described in the following examples.

EXAMPLE 1
Formation of an Amorphous Carbon-Coated Carbon Fabric

AvCarb™ 1243HCB carbon fabric was obtained from Textron Specialty Materials, Lowell, Mass. (now Textron Systems Corporation, Wilmington, Mass.). The fabric was treated by the National Coatings Corporation (Rockland, Mass.). Specifically, the fabric was impregnated with resin (AROFENE® 295-E-50, Ashland Chemical, Inc.) using a commercial prepregger and the resin was cured by heating to about 160° C. in air. The resin pickup was in the range of 30% to 40%.

A sample of the resin-impregnated fabric measuring approximately 7.5" by 10" was weighed. The sample was sent through a 15" carbonizing oven under the following conditions: zone 1, 350° C.; zone 2, 430° C.; zone 3, 525° C.; zone 4, 900° C.; zone 5, 1100° C.

The carbonizer conveyor belt was run at 2 feet per minute, resulting in a total residence time of about 30 minutes and a residence time at 1100° C. of approximately 3 minutes. The carbonizer was purged with nitrogen gas during this process at a rate of about 1000 scfh. After the material was carbonized, it was reweighed to determine the amount of carbon char on the fabric. The material had a carbon pickup value at this point of 21%. Visual inspection of the material revealed a uniform carbon coating with no evidence of dusting or flaking.

To obtain greater carbon pickup, the resin coating carbonization cycle was repeated a second time. The material was soaked in a solution of AROFENE® 295-E-150 resin, as supplied by the manufacturer, by immersing the material in the resin solution. The material was then sent through a Nip roll device, which removed excess resin and ensured a uniform resin coating. The material was then dried in air for one hour at 40° C. The resin was cured by heating the resin-impregnated composite in flowing air at 160° C. The curing oven was heated to this temperature over 45 minutes and maintained at 160° C. for an additional 45 minutes.

The resin coated composite was then carbonized as described above, resulting in an amorphous carbon-coated carbon fabric material with a carbon char pickup of about 75%. Visual inspection of this material also showed the carbon coating to be uniform with no evidence of dusting or flaking.

EXAMPLE 2
Preparation of an Amorphous Carbon-Coated Carbon Fabric Comprising Resin-Coated Yarn Strands An amorphous carbon-coated carbon fabric material having a carbon pickup of 16% was prepared as described above. A sample of this material measuring approximately 10"×7.5" was immersed for 45 minutes in AROFENE® 295-E-50 resin solution diluted to 80% with ethanol. The resin-coated composite material was passed through a Nip roll device to remove excess resin and then heated at 40° C. to dry the resin. The composite material was then heated to cure the resin in an oven which warmed from room temperature to 160° C. over 45 minutes. The resin-coated composite material was then heated in the carbonizer as described above to produce an amorphous carbon-coated carbon fabric material having a 55% carbon pickup. The composite was then immersed for 45 minutes in AROFENE® 295-E-50 resin solution diluted with ethanol to 15% of its original concentration. The resin coating was then cured by heating in flowing air from room temperature to 160° C. over 45 minutes and then maintained at this temperature for 45 minutes. This produced a resin-coated amorphous carbon-coated carbon fabric material with a 55% carbon pickup and a 7% resin pickup.

EXAMPLE 3
Preparation of an Amorphous Carbon-Coated Carbon Fabric Material Comprising Yarn Strands Coated with a Partially Charred Resin A 7.5" by 10" sample of an amorphous carbon-coated carbon fabric material having a carbon char pickup value of 67% was prepared as described above. The material was then immersed for 50 minutes in an AROFENE® 295-E-150 solution diluted to 50% of its original concentration with ethanol. The resin was then cured by heating the resin-impregnated composite in flowing air from room temperature to 160° C. over 30 minutes and then maintained at this temperature for 50 minutes. The resin-coated composite material was then heated to 300° C. for 10 minutes to produce an amorphous carbon-coated carbon fabric material having a partially charred resin coating. The material had a carbon pickup value of 67% and a partially-charred resin pickup value of 35%.

EXAMPLE 4
X-ray Crystallographic Analysis of Modified Carbon Fabric Materials X-ray crystallographic analysis of carbon/carbon materials was performed by Raytheon Electronic Systems, Lexington, Mass. The materials analyzed were (1) an amorphous carbon-coated carbon fabric material prepared according to the method of Example 2; (2) a modified carbon fabric material prepared by CVD according to the method outlined by Froberg; and (3) the carbon fabric serving as the substrate in samples (1) and (2).

The results of crystallographic analysis of the three samples are presented in FIG. 1, which shows the diffraction pattern obtained for each material. Each material exhibits the diffraction pattern of hexagonal graphite, a peak of greatest intensity at about 26 degrees with three weaker peaks at 43 degrees, 53 degrees and 79 degrees. The lattice patterns for these patterns are slightly larger (about 4%) than those listed in standard diffraction tables, most likely due to crystal point defects and/or imperfections. The peak widths are broad and increase with angle, also evidence of crystal imperfection. The diffraction peaks are, however, significantly weaker and broader for samples (1) and (3) relative to sample (2). The results indicate that the carbon of sample (1) is amorphous while the carbon matrix of sample (2) is substantially hexagonal graphite. The carbon fabric, sample (3), displays some crystallinity and may be responsible for the diffraction observed for sample

EXAMPLE 5
Crush Testing of Amorphous Carbon-Coated Carbon Fabric Materials

To test the crush resistance of amorphous carbon-coated carbon fabric, a small (e.g., about 0.5 inch square) piece of the amorphous carbon-coated carbon fabric material of Example 3 was placed in a press and subjected to 10 cycles of increased pressure to 3000 psi and back to ambient. The effect of crushing on the material was evaluated by use of a scanning electron microscope to evaluate fiber breakage and flaking and dusting of the amorphous carbon component.

Figure 3A:
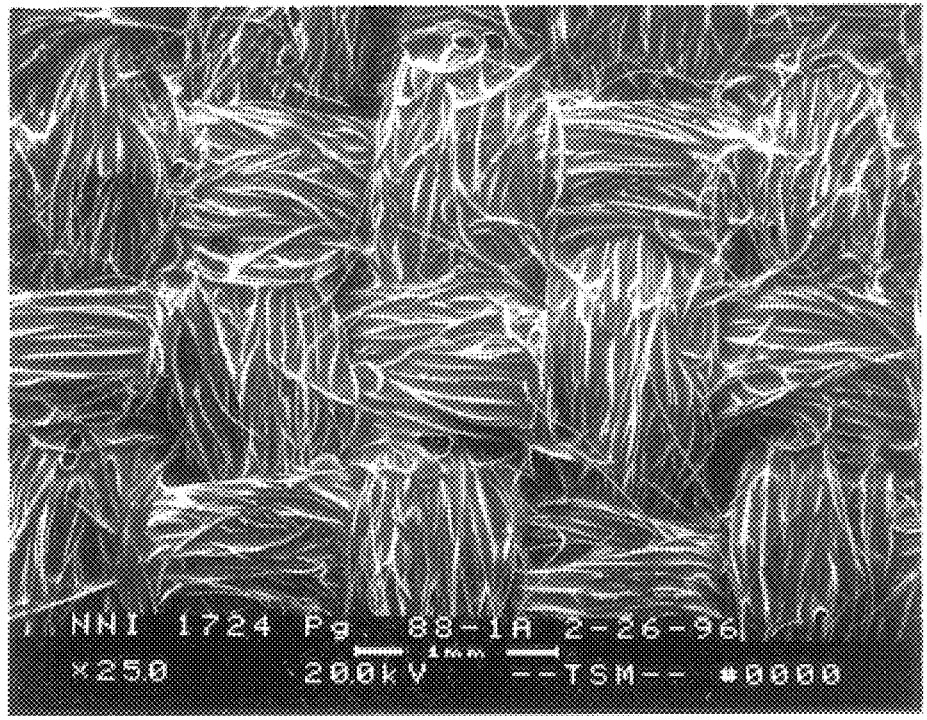
FIG. 3A is a scanning electron micrograph of a sample of an amorphous carbon-coated carbon fabric material prepared according to the general method described in Example 3, before crush testing.
Figure 3B:
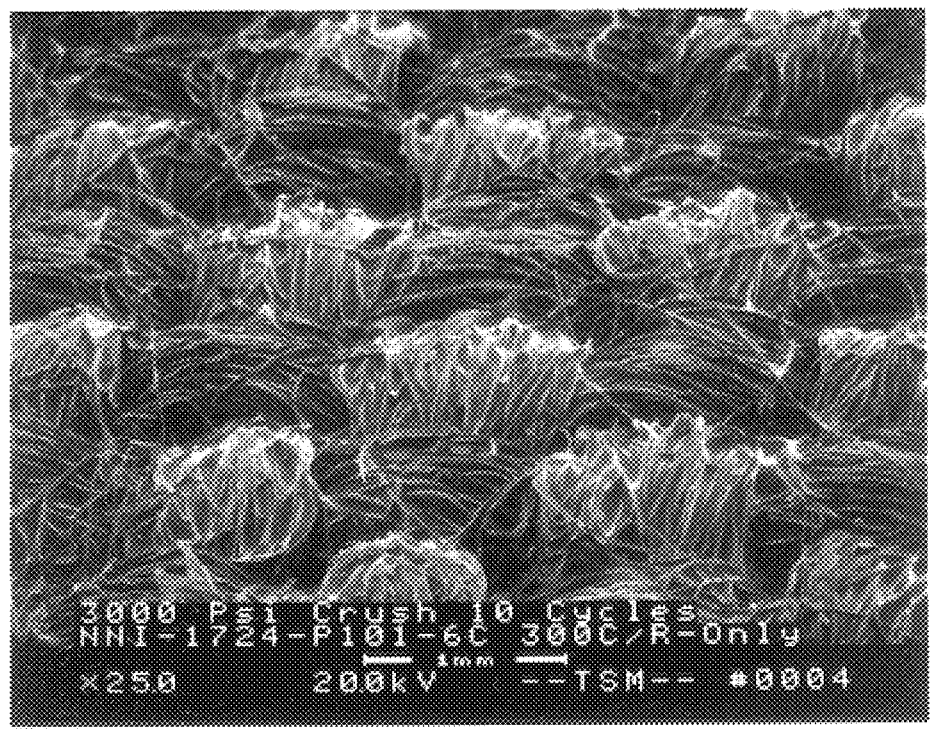
FIG. 3B is a scanning electron micrograph of the sample of FIG. 3A, following crush testing.

Crush test results for a sample prepared according to the general method of Example 2 are shown in FIGS. 3A and 3B, scanning electron micrographs of a sample of this material before and after crushing, respectively. FIG. 3B shows that no significant fiber breakage, dusting or flaking occurred under the conditions of the test.

EXAMPLE 6

Dynamometer Testing of Amorphous Carbon-Coated Carbon Fabric Materials

Evaluation of the wet frictional performance of several samples of the amorphous carbon-coated carbon fabric of the present invention was performed by a major automobile manufacturer. Samples were subjected to conventional dynamometer testing including flex and crush tests at 3000 psi over approximately 100 cycles. Transmission fluid flow rates and torques were measured at various temperatures and the relationship between torque and rotation rate (measured as revolutions per minute) was determined. The wear rate of the steel disc in contact with the amorphous carbon-coated carbon fabric was also measured. Other characteristics monitored included material compliance and compression effects and the presence of shudder.

Particularly favorable results were obtained for four samples prepared by the general method described in Example 2. These materials displayed good durability under the test conditions, suitable fluid flow rates and low opposing plate wear. Moreover, these materials showed a positive correlation between torque and rotation rate, a desirable characteristic of a wet friction material. Also, no shudder was observed.

Equivalents Those skilled in the art will recognize or be able to ascertain using no more than routine experimentation many equivalents to the specific embodiments of the invention described herein. Such equivalents are intended to be encompassed in the scope of the following claims.

We claim:

1. An amorphous carbon-coated carbon fabric comprising:
   (a) a single-ply of a woven carbon fabric comprising interwoven strands of yarn, wherein said yarn is formed of individual fibers having gaps between said fibers; and
   (b) amorphous carbon filling the gaps between the individual fibers.

2. The amorphous carbon-coated carbon fabric of claim 1 wherein the woven carbon fabric is at least 70% carbon by weight.

3. The amorphous carbon-coated carbon fabric of claim 2 wherein the woven carbon fabric is a plain weave fabric, a twill fabric or a satin fabric.

4. The amorphous carbon-coated carbon fabric of claim 2 having a carbon pickup value of about 15% or greater.

5. The amorphous carbon-coated carbon fabric of claim 4 having a carbon pickup value of about 50% or greater.

6. The amorphous carbon-coated carbon fabric of claim 5 having a carbon pickup value of about 100% or greater.

7. The amorphous carbon-coated carbon fabric of claim 2 wherein the yarn strands and amorphous carbon disposed therein are further coated with a resin.

8. The amorphous carbon-coated carbon fabric of claim 7 wherein the resin is partially carbonized.

9. The amorphous carbon-coated carbon fabric of claim 7 wherein the resin is selected from the group consisting of phenolic resins, epoxy resins, and isotropic pitches.

10. A method of forming an amorphous carbon-coated carbon fabric, comprising the steps of:
    (a) impregnating a single-ply woven carbon fabric, comprising interwoven yarn strands formed of bundles of individual fibers, with a resin to form a resin-impregnated carbon fabric; and
    (b) heating the resin-impregnated carbon fabric to char the resin to form an amorphous carbon residue, thereby forming the amorphous carbon-coated carbon fabric.

11. The method of claim 10 wherein the woven carbon fabric is a plain weave fabric, a twill fabric or a satin fabric.

12. The method of claim 10 wherein the resin is selected from the group consisting of phenolic resins, epoxy resins and isotropic pitches.

13. The method of claim 11 wherein the carbon fabric is impregnated with the resin by immersing the carbon fabric in a solution comprising the resin in an organic solvent.

14. The method of claim 10 wherein the carbon fabric is impregnated with the resin by the steps of:
    (i) laying a solid resin film upon the woven carbon fabric; and
    (ii) heating the resin film to a temperature sufficient to melt the resin, and form a liquid resin which flows into the gaps among the individual fibers, thereby impregnating the carbon fabric with the resin.

15. The method of claim 10 wherein steps (a) and (b) are repeated in sequence one or more times.

16. The method of claim 10 further comprising the steps of impregnating the amorphous carbon-coated carbon fabric with a resin, thereby forming an amorphous carbon-coated carbon fabric comprising resin-coated yarn strands.

17. The method of claim 16, further comprising the step of heating the amorphous carbon-coated carbon fabric comprising resin-coated yarn strands to a temperature sufficient to cure the resin.

18. The method of claim 16 further comprising the step of heating the resin-coated amorphous carbon-coated carbon fabric comprising resin-coated yarn strands to a temperature sufficient to partially char the resin, thereby forming an amorphous carbon-coated carbon fabric material comprising yarn strands coated with a partially charred resin.

19. In a wet friction device comprising at least two members mounted to rotate relative to each other, each member having a friction surface with the frictional surfaces confronting each other; means for frictionally engaging the friction surfaces to slow the relative rotation of the members; and a cooling liquid in contact with the frictional surfaces, the improvement comprising:

a sheet formed of an amorphous carbon-coated carbon fabric, said sheet defining at least one of said frictional surfaces.

20. The improvement of claim 19 wherein said device is an automotive brake, an automotive clutch, an automotive differential or a multi-disc coupling device.

* * * * *